Figure 1:
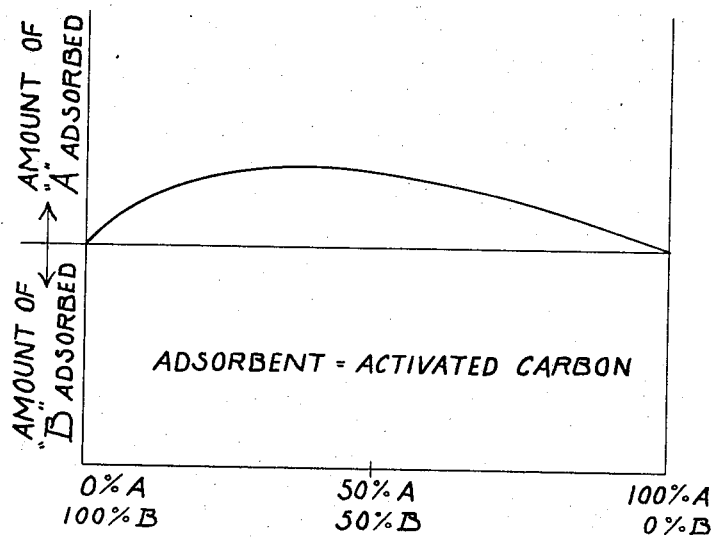

Patented July 3, 1951

2,559,157

UNITED STATES PATENT OFFICE 2,559,157

SEPARATION OF ISOPARAFFINS

Alfred E. Hirschler, Drexel Hill, Pa., assignor to Sun Oil Company, Philadelphia, Pa., a corporation of New Jersey Application June 11, 1948, Serial No. 32,485

14 Claims. (Cl. 260—676)

This invention relates to the separation of isoparaffin hydrocarbons from each other by selective absorption on activated carbon. The invention is especially useful for preparing an isoparaffin of high purity from a mixture of two or more isoparaffin hydrocarbons.

In the preparation of individual hydrocarbons by organic synthesis, it is seldom that the desired hydrocarbon may be produced directly in a high state of purity. Generally a mixture of hydrocarbons is formed, which includes isomers of the desired hydrocarbon and other related compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segregate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing very closely related hydrocarbons such as isomers or adjacent homologues. Usually the best that has been done from a practical aspect is to prepare hydrocarbons of technical purity, such as in concentration in the order of 80% to 95%. To produce hydrocarbons in a high state of purity, for example in concentrations better than 95%, from mixtures containing close boiling compounds of similar hydrocarbon type heretofore has been extremely difficult and, in many cases, practically impossible.

The present invention provides an improved method whereby relatively pure isoparaffin hydrocarbons may be prepared from a starting mixture of isoparaffins. It is especially useful when the starting material contains a high proportion of the desired isoparaffin together with a small amount of one or more other isoparaffin hydrocarbons boiling close to the desired isoparaffin, as when its isomers or its nearest homologues constitute the impurity.

I have discovered that all isoparaffin hydrocarbons have sufficiently different adsorbabilities to be separable by selective adsorption on activated carbon. Accordingly, the process of this invention comprises subjecting a mixture of such hydrocarbons to treatment in liquid phase with activated carbon to selectively adsorb one or more of the isoparaffins from the charge and separating from the adsorbent one or more fractions containing the other isoparaffin in a more nearly pure state. Where the isoparaffin which is selectively adsorbed is the hydrocarbon that is desired in purified form, it may be obtained by displacing the adsorbate from the carbon by means of a suitable desorbing agent.

I have further found that mixtures of isoparaffins exhibit adsorption behaviors which may be classified in two general types. One type occurs where one of the isoparaffin components is selectively adsorbed from the mixture throughout a portion of the concentration range while the other isoparaffin is the component which is selectively adsorbed throughout the remainder of the concentration range. Some isoparaffin mixtures behave in this manner. The other type occurs where one of the isoparaffins is the selectively adsorbable component throughout the whole concentration range. This is the more usual type of behavior for isoparaffins with an activated carbon adsorbent. All isoparaffins conform to one or the other type of behavior. It is not always possible to predict in advance which type of behavior will be exhibited by any given pair of the hydrocarbons; so that in any such case if it is desired to know with certainty in advance just which type of behavior will be encountered, it is necessary to predetermine the effect of proportions of the components on the relative adsorbabilities. This is not necessary in order to insure operability of the process, however, since a separation will always be effected in accordance with the invention regardless of the particular adsorption behavior of the charge components, as more fully discussed hereinafter.

The accompanying drawings are schematic illustrations of the types of behavior of isoparaffin hydrocarbon pairs as discussed above. The drawings depict the types of adsorption isotherms obtained for mixtures of two isoparaffins throughout the complete composition range of 0 to 100% for each component. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption, assuming no adsorption of the other component.)

Figure 2:
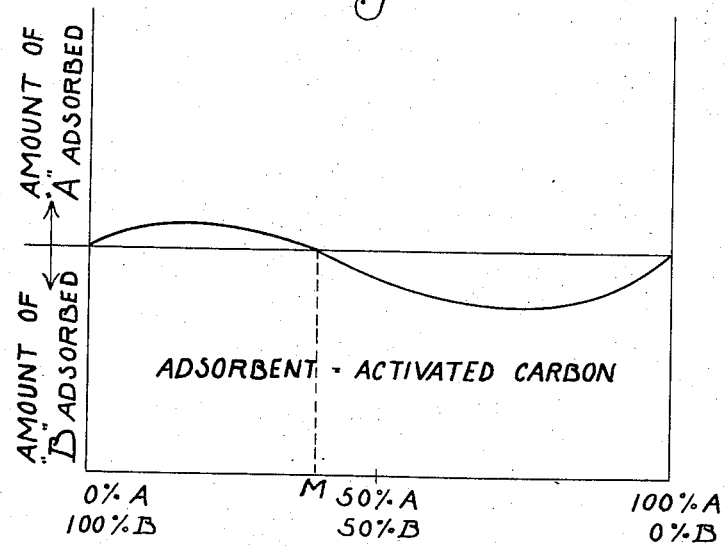

Figure 1 is representative of the more usual type of adsorption isotherm obtained for isoparaffins with activated carbon, wherein one of the components is selectively adsorbed throughout the whole concentration range. This type of adsorption isotherm is commonly referred to as the U-type. Figure 2 illustrates the adsorption isotherm where one of the isoparaffins is selectively adsorbed over part of the concentration range while the other isoparaffin is selectively adsorbed over the remainder of the range. This is known as an S-type isotherm.

Where the behavior is of the type shown in Figure 1, the A component is selectively adsorbed from any mixture of the hydrocarbons, A and B, regardless of its concentration. When a mixture of this type is treated with activated carbon, the A component will always be selectively removed, thus yielding the B component in a more nearly pure form. Also, by desorbing the A component from the used adsorbent in a suitable manner, A likewise may be obtained in purified form.

With the type of behavior as shown in Figure 2, component A is selectively adsorbable from any mixture of the hydrocarbons, A and B, which has a composition lying between 0% A and that represented by point M which is the composition corresponding to the point where the adsorption isotherm crosses the horizontal line. On the other hand, component B is selectively adsorbable from any mixture where the proportion of A is above that represented by point M. Either component may therefore be prepared in a highly purified state, depending upon which side of point M the starting mixture composition falls. For example, by starting with a technical grade of the A component, say a mixture which contains A in a concentration of 80% or 90% or the like, the mixture may be treated with activated carbon to selectively adsorb B and thereby obtain A in highly purified form. Likewise, by starting with a technical grade of the B component, B may be obtained in highly purified form. I have found that with mixtures of this type the smaller the amount of the hydrocarbon present as impurity, the more easily its removal may be accomplished according to the present process. This is in contrast to other separation methods such as distillation or solvent extraction wherein the separation becomes more difficult as the amount of the impurity decreases.

It should be noted that with isoparaffins which form the S-type adsorption isotherm (Figure 2), there is a theoretical point (M) at which the isoparaffins will have the same adsorbability and therefore would not, theoretically, be separable by selective adsorption. In actual practice, however, there is no condition at which separation is absolutely incapable of being effected. There are several reasons why at least some separation will occur even with a starting mixture which approximates, as closely as possible, the composition corresponding to the aforesaid theoretical point. One is that a mixture corresponding absolutely to such point could never be encountered, due to the fact that it is a point, as distinguished from a zone, and therefore is dimensionless and can only be approximated but never exactly reached. Thus, some separation will always result, although the degree of separation might not be commercially practicable where the starting mixture composition approached too closely to that corresponding to the theoretical point. Another reason depends upon the fact that, as I have discovered, this theoretical point changes to a substantial extent as the temperature of operation changes. In actual practice, it would never be the case that exactly the same temperature would obtain throughout the whole mass of activated carbon being used to treat the starting mixture. There would always be some differences in temperature throughout the adsorbent so that some separation would necessarily result regardless of the starting mixture composition. Still another possible reason why a separation may always be effected to some extent is that the individual particles of adsorbent within any given batch may vary somewhat in adsorptive qualities. For example, the theoretical point may be different depending upon the size of the particles segregated from a given batch of the adsorbent. Even if it were possible that the starting mixture corresponded exactly to the theoretical point for some of the particles, it might not so correspond for other particles constituting the adsorbent mass.

It is therefore apparent that regardless of what the particular proportion of isoparaffins in the starting mixture may be, a separation, at least to some extent, even with mixtures of the type shown in Figure 2, will always be effected in practicing the present process. It is impracticable to define the narrow zone on opposite sides of the theoretical point M within which the process might not have a degree of utility warranting its practice on a commercial scale. The limits of such narrow zone would not be critical and would vary with starting mixtures of different isoparaffins and their relative proportion, and more particularly with the degree of purification desired; but as explained above the present process would always be operative to effect some worth-while degree of separation.

Where the starting mixture is of the S-type and its composition is sufficiently close to the above discussed theoretical point M so that treatment of the mixture does not give a commercially worth-while improvement, the degree of separation may be improved by operating at a different temperature or by first changing the composition of the starting mixture in some other manner, for example, by distillation or by adding to the mixture more of one of the constituents, after which treatment may be carried out according to the present process to effect a high degree of purification.

A preferred method of conducting the process comprises carrying out the treatment by percolating the starting mixture of hydrocarbons through a column of the adsorbent. Preferably a large proportion of adsorbent is used relative to the amount of hydrocarbon material to be treated. After all of the charge has passed into the adsorbent, it may be followed by a desorbing agent comprising a material preferably more strongly adsorbable by activated carbon than the isoparaffin hydrocarbons in order to effect displacement of the adsorbate. Examples of such desorbing agents are benzene, toluene, xylene, phenol or other aryl compounds. Olefin hydrocarbons may also be used. A relatively low boiling aliphatic hydrocarbon such as butane or pentane also may be employed as the desorbing agent particularly when the charge material is sufficiently high boiling to be readily separable therefrom by distillation. The use of a desorbing agent is necessary where the desired component is the one which is selectively adsorbed. In the other case where the desired component is not preferentially adsorbed and therefore appears in highest purity as the first portion of efflux or filtrate from the column, a desorbing agent is not necessarily required provided sufficient charge is used to wet all of the adsorbent and produce a filtrate. In either case the efflux from the column is collected in separate fractions as desired in order to segregate the portion which has the desired purity.

With the type of system as illustrated in Figure 1, the first portion of efflux or filtrate will be relatively rich, as compared to the charge, in the less adsorbable component regardless of the charge composition. Succeeding portions will become less and less rich in this component, eventually becoming enriched with respect to the more adsorbable component as it is displaced from the adsorbent by means of the desorbing agent. Thus it is possible to obtain one component in concentrated form as the first portion of filtrate and also to obtain the other component in enriched form as the last portion of filtrate. The degree of separation will depend to some extent upon the amount of adsorbent used.

With hydrocarbons that behave as illustrated in Figure 2, the first portion of filtrate will comprise the less strongly adsorbable component in a relatively high state of purity as compared to the charge. Succeeding portions will decrease in purity and, as the adsorbate is displaced from the gel, the filtrate will become less pure than the charge. However, with this type of system the component which is preferentially adsorbed will never be obtained in high concentration but only in concentrations below that represented by point M.

The following examples, in which percentages are by volume, illustrate the invention more specifically.

*Example I*

A column having an internal diameter of about ½ inch and a height of 3 feet was packed with 50 grams of 60–90 mesh activated carbon. The column was provided with a water jacket through which water was continuously circulated at a temperature of about 45–50° F. to absorb heat generated due to wetting of the adsorbent. Forty-nine milliliters of a starting mixture consisting of 93% 2,2,3-trimethylbutane and 7% 2,4-dimethylpentane were percolated down through the column. After all of the charge had passed into the adsorbent, it was followed by benzene to displace the paraffin hydrocarbons from the column. The filtrate was collected in fractions and the composition of each fraction was determined. Results were as follows:

| Cut No. | Fraction of Charge | Content of 2,2,3-trimethylbutane, per cent |
| --- | --- | --- |
|  | Per cent |  |
| 1 | 0–8 | 99.5 |
| 2 | 8–20 | 98.5 |
| 3 | 20–36 | 95.5 |

It may be seen that the 2,4-dimethylpentane was selectively removed, resulting in a substantial purification of the 2,2,3-trimethylbutane. Still further purification could have been effected by retreating the cuts with activated carbon. When it is considered that the two components of the starting mixture here described have boiling points which are very nearly the same (differing only by about 0.1° C.), it becomes apparent that separation of these isoparaffins to the extent shown by the above data would be practically impossible to achieve by means of distillation, even under very efficient fractionating conditions.

*Example II*

In this example the starting material was composed of the same two paraffin hydrocarbons as in Example I, but the 2,4-dimethylpentane was the major component. The starting composition was 90% 2,4-dimethylpentane and 10% 2,2,3-trimethylbutane. This mixture was treated as described in Example I. The first portion of filtrate amounting to about 24% of the charge had a 2,4-dimethylpentane content varying from 80% up to 90% (charge composition). The next portion consisting of the 24–65% fraction had the same composition as the charge. The 65–90% portion contained 2,4-dimethylpentane in amount varying from 90% up to 98.5%.

These results show that the 2,4-dimethylpentane was selectively adsorbed even though it was the major component. A comparison of the results of this example and of Example I indicates that the two paraffins used in these examples form the type of system illustrated in Figure 1.

*Example III*

In this run 35 milliliters of a mixture consisting of 87% 2,4-dimethylpentane and 13% 2,3-dimethylpentane were treated with 50 grams of activated carbon in the same manner as previously described. Results were as follows:

| Cut No. | Fraction of Charge | Content of 2,4-dimethylpentane, per cent |
| --- | --- | --- |
|  | Per cent |  |
| 1 | 0–20 | 94 |
| 2 | 20–34 | 91 |
| 3 | 34–60 | 89 |

Further purification could have been effected by retreating the filtrate cuts.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used. Regeneration may also be effected by washing the carbon with a saturate hydrocarbon liquid which is lower boiling than the charge hydrocarbons. The reactivated adsorbent may then be re-used for further purification of isoparaffins.

The temperature at which the adsorption operation is carried out may affect the efficiency of the separation and it generally will be the case that the adsorbent will have a poorer adsorption capacity at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column or through cooling coils located within the adsorbent bed.

It will be understood that the above examples are merely illustrative and that the invention is applicable to the separation of any mixture of two or more isoparaffins. As previously stated, the invention is especially useful for purifying an isoparaffin from a feed mixture which already contains the desired isoparaffin in more or less concentrated form, for example, in a concentration exceeding 80%, say 90% or 95% or the like, together with one or more other isoparaffins which boil sufficiently close to the desired compound that further purification by distillation is impracticable.

This application is a continuation-in-part of my co-pending application Serial No. 672,683, filed May 27, 1946.

Having described my invention, what I claim and desire to protect by Letters Patent is:

1. A process for separating two isoparaffin hydrocarbons which comprises introducing a liquid mixture of such hydrocarbons, essentially free of unsaturate hydrocarbons, into a body of activated carbon, thereby selectively adsorbing one of said hydrocarbons, and separating from the adsorbent a filtrate fraction which contains only a portion of the total hydrocarbons introduced, thereby obtaining a product in which the proportion of one of said hydrocarbons to the other of said hydrocarbons is higher than in the starting mixture.

2. A process according to claim 1 in which the selectively adsorbed hydrocarbon is displaced from the absorbent by means of a desorbing agent and another fraction is thereby obtained in which the said proportion is lower than in the starting mixture.

3. A process according to claim 1 in which the two isoparaffin hydrocarbons are isomers.

4. A process according to claim 1 in which the two isoparaffin hydrocarbons are adjacent homologues.

5. A process for purifying an isoparaffin hydrocarbon from a saturate liquid hydrocarbon mixture which contains a major amount of the desired isoparaffin hydrocarbon and a small amount of another isoparaffin hydrocarbon as impurity which comprises filtering the mixture in liquid phase through a body of activated carbon, thereby selectively adsorbing said other hydrocarbon which is present in small amount, and separating from the adsorbent a filtrate fraction containing the desired isoparaffin hydrocarbon in relatively pure state.

6. A process according to claim 5 in which the two isoparaffin hydrocarbons are isomers.

7. A process according to claim 5 in which the two isoparaffin hydrocarbons are adjacent homologues.

8. A process according to claim 5 in which said major amount is in excess of 80%.

9. In a process of separating a liquid hydrocarbon mixture which is essentially free of unsaturate hydrocarbons and which comprises two isoparaffin hydrocarbons, A and B, having essentially the same adsorbability when they are present in a certain definite proportion, the steps which comprises subjecting such liquid mixture in which the proportion of A to B is substantially less than said certain definite proportion to treatment in liquid phase with activated carbon, thereby selectively adsorbing hydrocarbon A, and separating from the activated carbon a filtrate fraction which contains only a portion of the total hydrocarbons introduced, thereby obtaining hydrocarbon B in a relatively pure state.

10. A process according to claim 9 in which the two isoparaffin hydrocarbons are isomers.

11. A process according to claim 9 in which the two isoparaffin hydrocarbons are adjacent homologues.

12. A process for purifying an isoparaffin hydrocarbon from a saturate liquid hydrocarbon mixture containing a major proportion of the desired hydrocarbon in admixture with a minor proportion of another isoparaffin hydrocarbon as impurity, said isoparaffin hydrocarbons having the same adsorbability when admixed in a certain definite proportion, which comprises introducing such liquid mixture containing the desired isoparaffin in a major proportion substantially in excess of said certain definite proportion in liquid phase into a body of activated carbon, thereby selectively adsorbing the isoparaffin hydrocarbon which is present as impurity, and separating from the activated carbon a filtrate fraction which contains only a portion of the total hydrocarbons introduced, thereby obtaining the desired isoparaffin in more nearly pure state.

13. A process for purifying an isoparaffin hydrocarbon from a saturate liquid hydrocarbon mixture composed of at least 80% of the desired isoparaffin hydrocarbon in admixture with an isomeric isoparaffin hydrocarbon as impurity, said isoparaffins having the same adsorbability when admixed in a certain definite proportion, which comprises introducing such mixture containing the second-named isoparaffin in a proportion substantially less than said certain definite proportion in liquid phase into a body of activated carbon, thereby selectively adsorbing the second-named isoparaffin, and separating from the activated carbon a filtrate fraction which contains only a portion of the total hydrocarbons introduced, thereby obtaining the desired isoparaffin in more nearly pure state.

14. A process for purifying an isoparaffin hydrocarbon from a saturate liquid hydrocarbon mixture composed of at least 80% of the desired isoparaffin hydrocarbon in admixture with an isoparaffin hydrocarbon which is an adjacent homologue, said isoparaffins having the same adsorbability when admixed in a certain definite proportion, which comprises introducing such mixture containing the second-named isoparaffin in a proportion substantially less than said certain definite proportion in liquid phase into a body of activated carbon, thereby selectively adsorbing the second-named isoparaffin, and separating from the activated carbon a filtrate fraction which contains only a portion of the total hydrocarbons introduced, thereby obtaining the desired isoparaffin in more nearly pure state.

ALFRED E. HIRSCHLER.

REFERENCES CITED

The following references are of record in the file of this patent:

UNITED STATES PATENTS

| Number | Name | Date |
| --- | --- | --- |
| 2,449,402 | Lipkin et al. | Sept. 14, 1948 |

OTHER REFERENCES

Mair et al., The Oil and Gas Journal, Sept. 19, 1935, pages 29, 30 and 32.

Turner, Petroleum Refiner, vol. 22, No. 5, pages 140 to 144 (1943).